Figure 1:
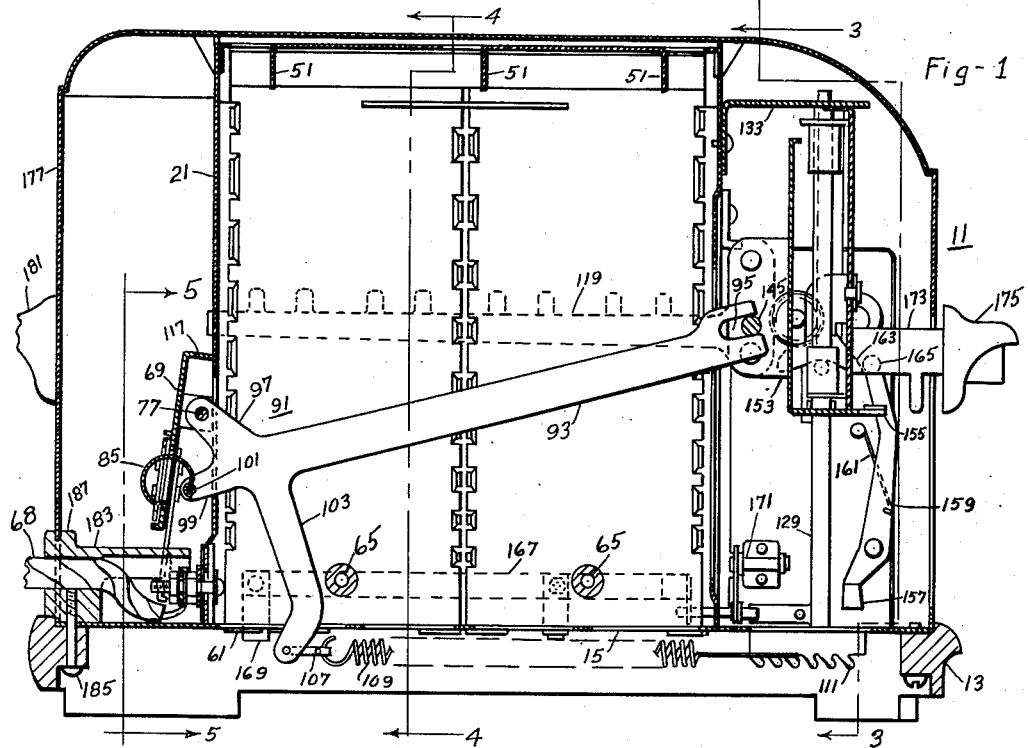

Sept. 5, 1939.  R. SARDESON  2,171,897
AUTOMATIC TOASTER
Filed May 6, 1938  3 Sheets-Sheet 1

Inventor
Robert Sardeson
By H M Bielul
Attorney

Sept. 5, 1939.   R. SARDESON   2,171,897
AUTOMATIC TOASTER
Filed May 6, 1938   3 Sheets-Sheet 2
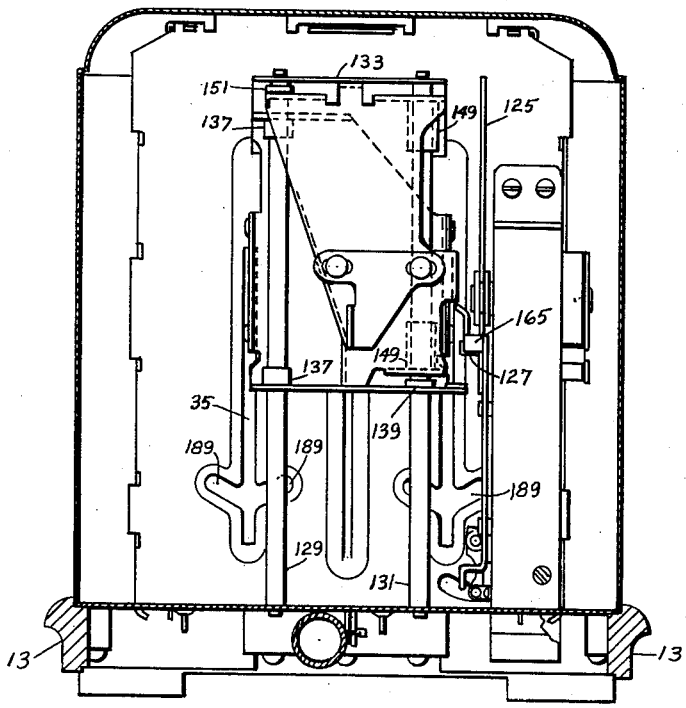
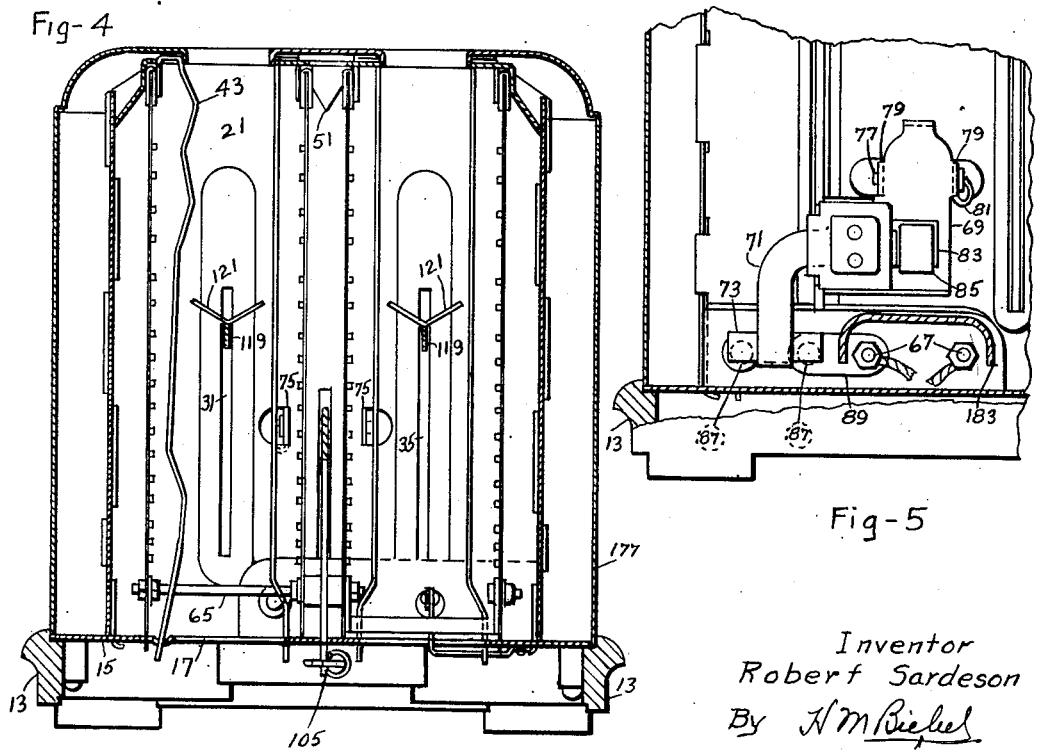
Inventor
Robert Sardeson
By H M Bielul
Attorney Sept. 5, 1939.  R. SARDESON  2,171,897
AUTOMATIC TOASTER
Filed May 6, 1938  3 Sheets-Sheet 3

Inventor
Robert Sardeson
By A. M. Biebel
Attorney

Patented Sept. 5, 1939

2,171,897

UNITED STATES PATENT OFFICE 2,171,897

AUTOMATIC TOASTER

Robert Sardeson, Minneapolis, Minn., assignor to McGraw Electric Company, Chicago, Ill., a corporation of Delaware Application May 6, 1938, Serial No. 206,374

11 Claims. (219—19)

My invention relates to electric cooking devices and particularly to electric toasters.

An object of my invention is to provide an electric toaster having a minimum number of parts that shall permit of quick and easy assembly.

Another object of my invention is to provide an automatic electric toaster assembly comprising a plurality of sub-assemblies which can be built as separate units.

Another object of my invention is to provide an automatic electric toaster that shall be designed and constructed to provide a pair of separate mechanism chambers one at the front end and one at the rear end of the toaster assembly.

Another object of my invention is to provide an electric toaster assembly in which the control switch for the electric heating elements shall be located in such position as to reduce the number and length of the internal electric conductors to a minimum.

Other objects of my invention will either be set forth in the course of the description of one embodiment of my invention now preferred by me and in the appended claims or will be apparent therefrom.

Figure 2:
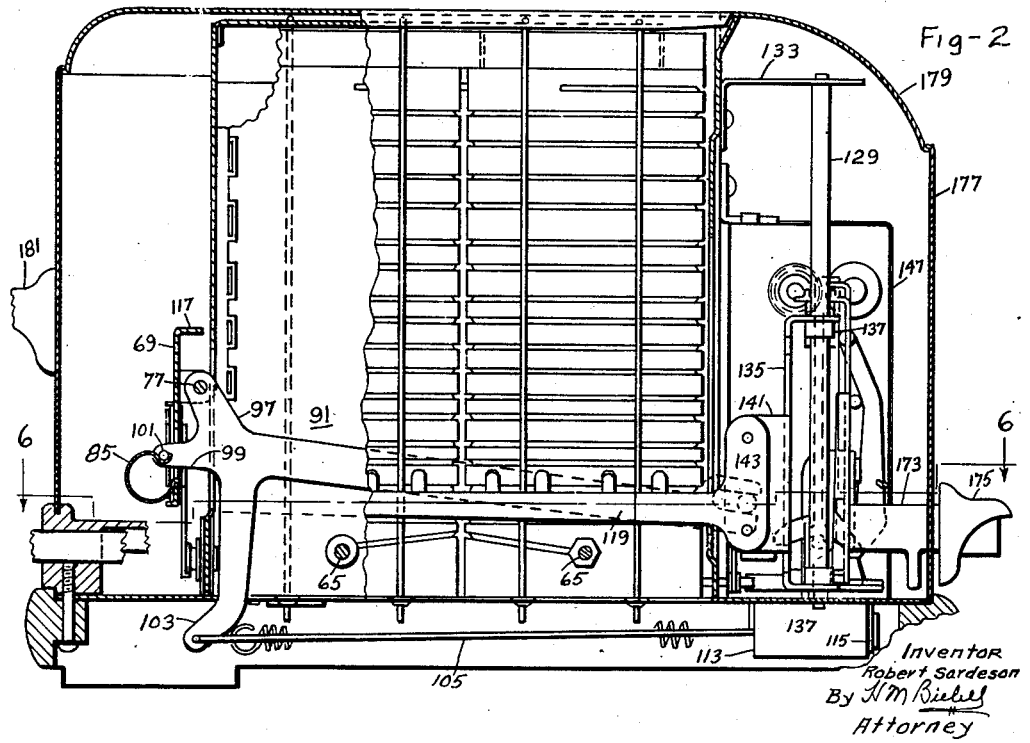
Figures 6, 7, 8:
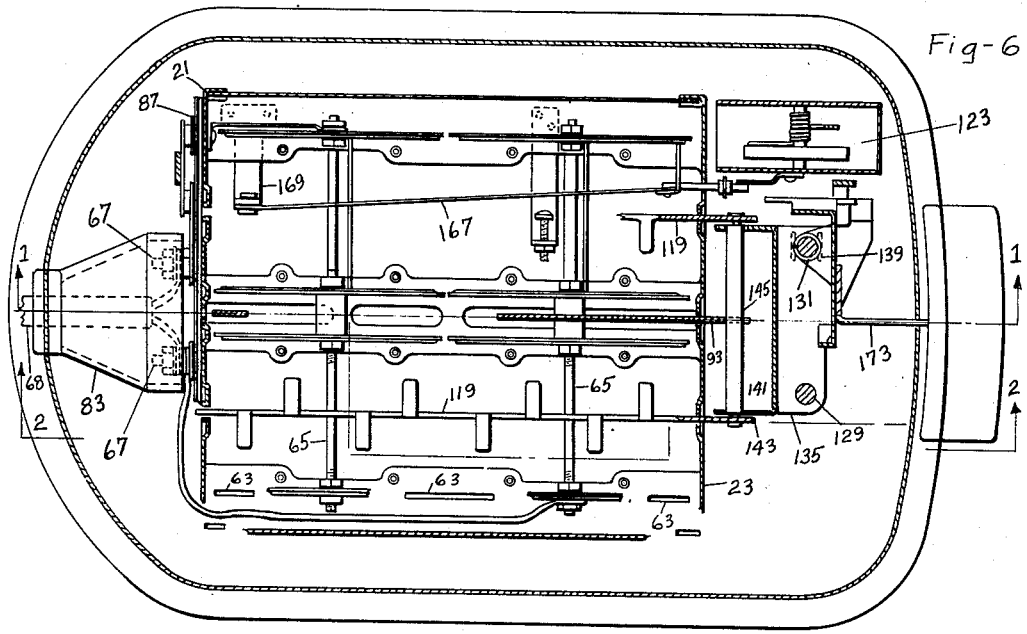

In the drawings,

Fig. 1 is a central vertical sectional view, taken on the line 1—1 of Fig. 6 showing a toaster embodying my invention in normal or non-operating position, Fig. 2 is a vertical sectional view of the device taken on the line 2—2 of Fig. 6 and showing the toaster in operating position, Fig. 3 is a front elevational view partially in section taken on the line 3—3 of Fig. 1 showing the parts in non-toasting position, Fig. 4 is a vertical sectional view laterally of the toaster taken on the line 4—4 of Fig. 1 showing the parts in non-toasting position, Fig. 5 is a fragmentary rear view of the electric switch used on the toaster and taken on line 5—5 of Fig. 1, Fig. 6 is a horizontal plan view taken on the line 6—6 of Fig. 2, Fig. 7 is a fragmentary isometric view showing the one piece construction of the inverted U-shape frame constituting a part of the toasting chamber walls, and, Fig. 8 is a fragmentary isometric view of the of the outer heating elements showing the projections used in supporting and locating the element on the base.

Some of the details shown in the several drawings are old and well known in the art but in order to more clearly show the details which I consider novel an entire assembly of an automatic toaster is shown in the drawings and will be described herein.

A toaster designated generally by the numeral 11 includes a skeleton base frame 13 of a molded composition material having secured against the upper recessed surface thereof a metal base plate 15 which base plate is provided with a number of longitudinally extending openings 17 therein equal in number to the number of slices or bread which can be toasted in the toaster at one time. While I have illustrated and described my invention as applied to a two slice toaster, it is obvious that my invention is not limited thereto but is equally applicable to a toaster designed and constructed to simultaneously toast any desired number of slices of bread.

An inner frame 19 consists of a single sheet of metal, substantially one half of which is shown in its finished shape in Fig. 7 of the drawings. The frame or inner casing 19 includes a rear wall 21, a front wall 23 and three longitudinally-extending intermediate connecting portions 25, 27 and 29. The rear intermediate wall portion 21 is provided with one or more vertically extending slots 31 for a purpose to be hereinafter referred to while the front wall 23 has a vertically extending intermediate slot 33 therein as well as two other vertically extending slots 35. The use of these slots will be set forth in detail hereinafter.

The central longitudinally extending strip 27 is spaced from the lateral strips or portions 25 and 29 a distance sufficent to permit of the introduction of slices of bread into the toasting chamber and to permit of removal therefrom when the slices of bread have been toasted. These openings may be designated by numerals 37 and the number of such openings is in accordance with the number of slices of bread which are to be toasted in the toaster at one time.

The lateral strip or portion 25 is provided with a number of recesses 39 at its inner edge and a number of openings 41 closely adjacent to be spaced from the recesses 39 in order that a plurality of guard or guide wires 43 (see Fig. 3) may be suspended from the intermediate portions of the inner frame 19. The normally horizontal portion of strip 25 is relatively narrow and ends in a downwardly projecting flange portion 45, the upper part of which is bent at substantially right angles to the plane of the portion 25 while the lower part of flange 45 extends angularly outwardly, the vertically extending portion being cut back as shown at 47 in Fig. 7 of the drawings in order to provide a clearance between the vertical portion and front and rear walls 21 and 23. The length of the angularly outwardly extending part of flange 45 is such that when front and rear walls 21 and 23 have been bent to substantially the position shown for front wall 23 in Fig. 7 of the drawings, the ends of the flange 45 will abut against adjacent portions of the front and rear walls 21 and 23 thereby preventing longitudinal movement or sway of the upper end of the inverted U-shape frame 19. It will be noted further that the connecting portion between strip 25 and front wall 23 has an opening 49 therein the purpose of this opening being to weaken this lateral section of the inverted frame portion of U-shape to permit of an operator easily and quickly bending the initially flat sheet (after it has been punched) to the form shown for one-half of the frame, in Fig. 7 of the drawings.

Intermediate strip 27 is provided with similar recesses 39 and openings 41 therein at each of its sides for the same purpose as was hereinbefore described for strip 25. Strip 27 has a plurality of depending portions or lugs 51 (see Fig. 7) punched out in a downwardly direction for a purpose to be hereinafter referred to. Openings 53 extending laterally of the strip 27 at the junction thereof with the rear wall 21 and the front wall 23 are provided for the same purpose as was set forth in connection with opening 49.

Strip 29 is of substantially the same shape and has the same details of construction as were set forth in connection with strip 25 and need not therefore be further described in detail.

Front intermediate plate wall is provided with a depending extension 55 at each side thereof, which extensions are adapted to fit into suitable openings in the base plate and to be twisted relatively thereto below the base plate whereby to securely hold the frame on the base plate when in assembled position. The same comments as have been made above in regard to the front half portion of the frame of inverted U-shape apply equally to the rear half thereof, which rear half is not shown in Fig. 7 of the drawings and since the general details of both halves are the same no further description is deemed necessary of the entire frame 19.

A plurality of planar electric heating elements 57 are provided, two such heating elements being provided for each slice of bread to be toasted in the toaster, in a manner now well known in the art. Each heating element 57 includes one or several thin sheets of electric insulating material on which is wound, either on both sides of the sheet or on one side thereof, (as shown more particularly in Fig. 8 of the drawings), a suitable electric resistor 59, in a manner now well known in the art. Each of the thin sheets of electric insulating material are provided with spaced depending portions 61 which depending portions are adapted to fit into openings 63 in base plate 15 in order to hold the bottom ends of the respective heaters in proper operative position on the base plate and to maintain these lower end portions in the desired spacing on the base plate. The upper ends of the respective planar heating elements are held in their desired operative positions in the following manner; lateral outward movement of the upper end portion of the outer heating elements is prevented by engagement of the upper edge portion of the mica slots with the vertical portion of flange 45 while lateral movement in the other direction is prevented by depending portions of guard wires 45 as will be noted more particularly from Fig. 4 of the drawings. This holds good for both outer heating elements. The inner heating elements are prevented from movement laterally of the toaster in one direction by the depending punched-out members 51 while they are prevented from movement in the opposite direction by depending portions of the guard wires as shown in Fig. 4 of the drawings. A pair of laterally-extending electrical-conducting rods 65 are provided in the toaster assembly near the bottom of the respective heating elements in order to properly electrically connect the plurality of heating elements in parallel circuit relation relatively to each other. The rear wall 21 has insulatedly mounted thereon just above the bottom edge thereof a pair of terminals 67 of usual form to which a twin supply conductor cord 68 may be connected in the usual manner.

A quick acting switch is mounted on the rear intermediate wall 21 and comprises a pivotally mounted switch plate 69 having a contact arm 71 and a contact bridging member 73 insulatedly mounted thereon, elements 71 and 73 being positioned in substantially the same plane as that of plate 69. Rear wall 21 has a pair of ears 75 punched out therefrom, each of these ears being provided with a perforation therethrough to receive a pivot pin 77 on which plate 69 is pivotally mounted as by a pair of ears 79 bent at substantially right angles to the plane of plate 69. It may be noted that a lug 81 (see Fig. 5) is a part of one of the ears 79 and may be bent around against the head of the pivot pin or bolt 77 to hold the pivot pin in proper operative position.

Plate 69 has an opening 83 therein to receive an over center spring 85 of the general shape shown in Figs. 1 and 2 of the drawings, one end portion of spring 85 engaging the wall at the lower edge of opening 83.

The terminals 67 and fixedly mounted switch contact members 87 are insulated from the rear wall 21 by a single sheet of mica and the left hand terminal 67 is connected with the right hand contact 87 by a short bar 89 thus providing a very short connector between the terminal and one contact member of the control switch for the heating elements.

Means for actuating the switch includes a compound bellcrank lever 91 having a forwardly-extending long arm 93, the front end of which is slotted as shown at 95, a short angularly rearwardly and upwardly extending arm 97 being pivoted on pivot pin 77. The bellcrank lever 91 includes also a rearwardly extending short arm 99 having a pin 101 extending therethrough which pin is engaged by the other end of spring 85, which as shown is of substantially C-shape. The bellcrank lever includes also a depending portion arm 103 which is long enough to extend through a slot in base plate 15. A rod 105 positioned beneath the base plate 15 has a return bent portion 107 at its rear end which return bent portion extends through a small hole in the lower end of arm 103 and is engaged by one end of a coil spring 109 the other forward end of which may be selectively hooked in any one of a number of serrations 111 formed in a depending punched out portion provided at the front end of base plate 15. The forward end of rod 105 ends in a piston adapted to move in a cylinder 113 which is held adjacent to and beneath the bottom of base plate 15 in any suitable manner here shown as by a depending bracket lug 115. The effect of coil spring 109 is to bias the bellcrank lever to the position shown in Fig. 1 of the drawings, in which positions the switch will be open, all of the parts of the toaster being shown in their normal positions in Fig. 1. When in the course of an operation of the toaster the bellcrank lever is turned in a clockwise direction, as will be set forth more in detail hereinafter, coil spring 109 is placed under greater tension and over-center spring 85 is moved to substantially the position shown in Fig. 2 of the drawings where the contact bridging member is in engagement with the fixed contact members hereinbefore described. Attention may here be called to a stop lug 117 at the upper end of switch plate 69 which stop lug limits the turning movement of the switch plate and the parts immediately connected therewith.

Bread slice supports 119, one for each pair of spaced electric heating elements, are vertically movable within the toasting chamber constituted by the outer electric heating elements and more particularly the thin sheets of electric insulating material, the front and rear walls 21 and 23 and the upper intermediate connecting portions 25, 27 and 29. These bread slice supports 119 include a relatively narrow vertically extending bar of thin sheet metal having laterally and angularly upwardly extending lugs 121 integral therewith or secured thereto on which slices of bread may rest while being toasted within the toasting chamber. The rear end portions of the members 119 extend through and move in the slots 31 while the forward ends of these bars extend through and move in the slots 35. The front portion of arm 93 moves in slot 33 hereinbefore described.

A mechanical timer indicated generally at 123 in the different figures of the drawings may be of the type described and claimed in Patent No. 1,866,808 to Murray Ireland which patent is assigned to the same assignee as the present application. Reference may be had to the Ireland patent for all the details of a timer of this kind. The timer includes a rack bar 125 which meshes with a pinion on the spring shaft of the timer, this rack bar having a lateral lug 127 thereon to permit of effecting downward movement of the rack bar and thereby winding the spring of the timer.

Means for initiating a toasting operation includes a pair of spaced vertical standards 129 and 131 the lower ends of which interfit with the base plate 15 while the upper ends thereof are held by a bracket plate 133 which bracket is of substantially L-shape having one portion thereof secured to the front wall 23. A lower carriage 135, of generally plate shape, is supported on standard 129 by two vertically spaced coaxial bushings 137 whereby angular motion of the lower carriage in two directions extending at right angles to each other is prevented, while the right hand side of the lower carriage is guided by two spaced parallel-extending flat ears 139 one at each side of the right hand standard 131. It is evident that it is easy to so construct the lower carriage and mount the bushing in laterally extending portions thereon that there will be no binding of the bushings on the standard and since the distance between the lugs 139, as well as their width, is slightly greater than the diameter of standard 131 there is no danger of any binding of this carriage in its travel vertically along these standards even should one of the standards be out of parallel alinement with the other standard in either of two directions. Lower carriage 135 has a pair of laterally extending flanges 141 to which are loosely secured the widened front end portions 143 of the respective bread slice supports 119. I wish to point out that the mounting of the bread slice supports and particularly of the widened end portions 143 on the flanges 141 is by a cross bar 145 (see Fig. 6) but while bar 145 is rigidly secured to the flanges 141 the portions 143 are loosely mounted on reduced end portions of cross bar 145 in order that there may be no binding of the bread slice supports in their travel in the slots in the front and rear walls 23 and 21. It is obvious that the bread slice supports will be guided by the walls of the slots 31 and 35.

An upper carriage 147, also of generally plate shape, is slidably supported on the right hand standard 131 by a plurality of coaxially alined bushings 149 while the left hand edge (as seen from front of the toaster) is guided on standard 129 in a manner similar to that set forth hereinbefore for the lower carriage, namely by a pair of upstanding ears 151 similar to the ears 139. The same remarks made hereinbefore in connection with the lower carriage apply equally well here as to the impossibility of binding of the carriage even in case of misalinement of the standards relatively to each other. It will be noted that cross rod 145 moves in the slot 95 in arm 93 so that if lower carriage 135 is moved downwardly not only are the bread slice supports moved downwardly but also the bellcrank lever will be moved in a clockwise direction whereby closing of the switch is effected as has already been set forth.

The upper carriage 147 is provided with a laterally and downwardly extending member 153 the lower edge of which is of inverted V-shape, (see Fig. 1) which edge is adapted to engage lug 127 on rack bar 125 so that downward movement of the upper carriage will cause downward movement of the rack bar and winding of the timer spring. It is obvious that downward movement of the upper carriage will cause downward movement of the lower carriage, this latter carriage being provided with a lateral extension 155 adapted to move under the lower detent portion 157 of a latch arm 159 which is pivotally mounted intermediate its ends on the timer and biased in a clockwise direction (as seen in Figs. 1 and 2 of the drawings) by a spring 161.

It is therefore obvious that while lower carriage 135 is held in its lowered position after both carriages have been moved downwardly as above described, upper carriage 147 will be moved slowly upwardly by upward movement of the rack bar incident to running down of the timer. Member 153 has an upper angularly extending edge 163 (see Fig. 1) adapted to engage a laterally extending lug 165 on the upper end of latch arm 159 whereby to cause turning movement of the latch arm in a direction to disengage detent 157 from portion 155 immediately after which the lower carriage is moved quickly upwardly by the effect of spring 109. Upward movement of the front end of the bellcrank lever 91 results in such movement of arm 99 and pin 101 therein as to move spring 85 in a direction to open the switch and thereby deenergize the heating elements.

As has already hereinbefore been stated the timer 123 is of the kind the speed of which can be varied either manually or otherwise and while these details constitute no part of my invention I have shown a bimetallic element 167 (see Fig. 1 of the drawings) anchored or supported at its rear end on a suitable bracket 169, its front end being provided with means for engaging and moving a speed changing lever 171, this lever being so connected to the mechanism of the timer that movement thereof will cause a change in the speed of the operation of the timer.

Upper carriage 147 has loosely secured thereto an arm 173 on the outer end of which may be mounted an actuating knob 175, whereby downward movement of the carriages may be effected to initiate a toasting operation.

An outer casing 177, including more particularly two sides, a rear and a front wall, encloses the toasting chamber, the rear mechanism chamber in which the switch is located and the front mechanism chamber in which the standards, the carriages and the timer are located, a cover 179 being provided to close the top of the assembly.

Reference may here be made to a combined bushing and insulator member 183 which is held against the upper face of base plate 15 at the rear end of the toaster assembly by a screw 185 extending through the skeleton frame 13 and the base plate 15 into the member 183. At its rear or outer portion member 183 is provided with a groove 187 (see Fig. 1) whereby the walls of a cut out portion of the rear wall of outer casing 177 may fit into the groove to provide a pleasing appearance of these parts of the assembly. The top view of member 183 is shown more particularly in Fig. 6 of the drawings from which it will be noted that the rear or inner end portion of member 183 is of inverted channel shape, (as will be seen more particularly by reference to Fig. 5 of the drawings) thereby providing an effective insulation between the terminal 67 and the switch parts closely adjacent thereto.

The skeletonized inner frame, of inverted U-shape, having at least one longitudinally extending slot in its intermediate portion and having a pair of laterally extending weakened portions adjacent the respective ends of the slot, permits of easily and quickly bending the inner frame to its proper form of substantially U-shape, the depending longitudinally extending flange portions fitting closely between the vertically extending walls of the frame to prevent longitudinal sway of the upper end thereof. The control switch for the heating elements is mounted in an advantageous position at the rear of the toaster assembly near to the terminals of the heating elements whereby the wiring connections between these elements are greatly simplified thereby reducing the risk of a breakdown in the electrically insulated conductors when a number of such conductors are used as has heretofore been the case. The inner frame 19 is substantially inherently rigid as regards the upper end thereof and it is easy to so arrange its mounting on the base plate as to maintain the lower ends of the front and rear walls rigidly on the base plate.

The bread slice supports 119 may be mounted on lower carriage 135 as a sub-assembly, the bread slice supports 119 being insertable through the front wall 23 through lateral extensions 189 shown more particularly in Fig. 7 of the drawings, these laterally extending portions being so shaped that the bread slice supports may be inserted therethrough into the toasting chamber.

It will be noted further that the mounting of the respective lower and upper carriage is such as to provide a non-binding three point engagement with the two standards thereby making it unnecessary to insist upon extreme accuracy in the location and alinement of the standards. This is of course an important element in the matter of reducing the cost of assembly of a device of this kind. As has already been said hereinbefore the walls of the slots in the front and rear walls of the inner frame constitute the guides for the bread slice supports, the construction shown in the drawings being such as to reduce to a negligible minimum the possibility of frictional engagement between the bread slice supports and the walls of the guiding slots which might result in squeaks when the bread slice supports are moving from one to another of their positions.

The inner single piece frame may be machine processed as a unit, requiring only somewhat more complicated dies to reduce the number of punching and forming operations and therefore the number of separate handlings and it may also be nickel plated as a unit. All of these operations leave the front and rear wall portions in one plane with the spaced intermediate connecting strips, thus greatly simplifying the handling during manufacture. As has already been set forth the two end wall portions are manually bent to proper position by a workman at the time of assembly of a toaster. Use of a single piece frame tends to reduce warehousing problems, the issuance of parts as well as the number of parts to be handled by an assembler.

While I have illustrated and described a specific embodiment of my invention, I do not desire to be limited thereto and therefore desire that the appended claims shall be limited only by the pertinent prior art.

I claim as my invention:

1. A toaster including a base, an inner skeletonized frame of inverted U-shape, having at least one longitudinally-extending slot in its intermediate portion and a pair of laterally-extending weakened portions at the respective ends of the slot, the frame being bent to U-shape at said weakened portions, electric heating elements extending vertically between the base and the intermediate portion of the frame, a switch for the heating elements insulatedly mounted on and supported solely by the rear vertical portion of the frame and means actuable from the front of the toaster for closing said switch.

2. A toaster including a base, an outer casing thereon, an inner skeletonized frame of inverted U-shape secured to the base and positioned within the outer casing to provide a front and a rear mechanism chamber, electric heating means in the frame, a snap-acting control switch for the heating means in the rear mechanism chamber mounted on and supported solely by the rear vertically-extending wall of the frame, said switch including an over center spring, a lever arm pivotally mounted on said rear wall and having a projection engaging said over center spring to actuate the same and means actuable from the front of the outer casing operatively connected with said lever arm to cause closing of said switch.

3. A toaster including a base, an inner skeletonized frame of inverted U-shape, having at least one longitudinally-extending slot in its intermediate portion and a pair of laterally-extending weakened portions at the respective ends of the slot, the frame being bent to U-shape at said weakened portions, said intermediate frame portion having a longitudinally-extending flange portion depending and fitting closely between the vertical walls of the frame to prevent longitudinal sway of the upper end of the frame.

4. A toaster including a base, an outer casing on the base, an inner frame of inverted U-shape on the base, electric heating elements in the frame, a control switch for the electric heating elements mounted on and supported solely on the rear wall of said frame, terminals for the heating elements mounted on the rear wall of said frame and an insulating bushing secured to said base at its rear end for protecting a supply conductor cord from the rear part of the outer casing, said bushing having a flange portion extending toward the rear wall of the inner frame to shield the terminals from the control switch.

5. A toaster including a base, an inner frame of inverted U-shape, on the base, electric heating elements on the base within the frame, a bread slice support within the frame, vertically movable relatively to the heating elements, a pair of standards on the base between the front walls of the frame and the casing and a carriage vertically slidable on said standards and having a non-binding three point engagement with said standards and means loosely connecting the bread slice support with said carriage.

6. A toaster including a base, an outer casing on the base, an inner frame of inverted U-shape, on the base, heating means in the inner frame, a pair of vertical rods on the base between the front walls of the frame and of the outer casing, a carriage movable on said pair of rods and having a non-binding three point engagement with said rods, and a bread slice support having an appreciable lateral width, in the inner frame loosely connected with the carriage, the front wall of said inner frame having an opening therein for insertion of the bread slice support into its proper operative position within the inner frame and a vertical slot connected to and extending upwardly from said opening, the walls of said slot forming a guide for the bread slice support in its vertical movement.

7. A toaster including a base, an inner frame of inverted U-shape on the base, electric heating elements in the frame, a switch arm pivotally mounted on the rear wall of said frame, a switch actuating lever arm pivotally mounted on the rear wall of said frame and having a common pivot with said switch arm, an over center spring connecting said switch arm and said lever arm and means at the front of the base operatively connected with said lever arm to actuate the same.

8. A toaster including a base, a casing thereon, electric heating elements within the casing, a pair of spaced vertical rods in the casing, a carriage vertically slidable on said rods and having a pair of bushings thereon engaging one of said rods and a pair of spaced ears engaging the other rod and a bread slice support carried by and movable with said carriage.

9. A toaster including a base, a casing thereon, electric heating elements in the casing, a pair of spaced vertical rods in the casing, a carriage vertically slidable on said rods and having a pair of bushings thereon engaging one of said rods and a pair of flat spaced ears engaging the other rod, a bread slice support and means loosely connecting said bread slice support to said carriage.

10. A toaster including a base, a casing thereon, a toasting compartment in the casing including a front intermediate wall, heating elements in the casing, a carriage in the casing in front of said front intermediate wall, a bread slice support in the toasting chamber having an appreciable lateral width, loosely connected with and supported by the carriage and an opening in said front intermediate wall having a shape which is complementary to the shape of the bread slice support in lateral section to effect insertion of the bread slice support in a substantially normal position, into the toasting chamber by a substantially horizontal movement through said opening from the front of the toaster.

11. A toaster including a base, a casing thereon, a toasting compartment in the casing including a front intermediate wall, heating elements in said casing, a vertically movable carriage in the casing in front of the front intermediate wall, a plurality of bread slice supports in the toasting chamber, each having an appreciable lateral width and loosely mounted on and movable with the carriage, a corresponding plurality of slots in said front intermediate wall, each having an opening at one point thereof of a shape complementary to the shape of the bread slice supports in lateral section to effect insertion of the bread slice supports when connected with the carriage, into the toasting chamber by a substantially horizontal movement through said openings from the front of the toaster.

ROBERT SARDESON.